No. 738,119. PATENTED SEPT. 1, 1903.
S. N. NAVASCUEZ.
SHUTTER FOR AUTOMATIC PHOTOGRAPHIC CAMERAS.
APPLICATION FILED SEPT. 4, 1902.
NO MODEL. 2 SHEETS—SHEET 1.
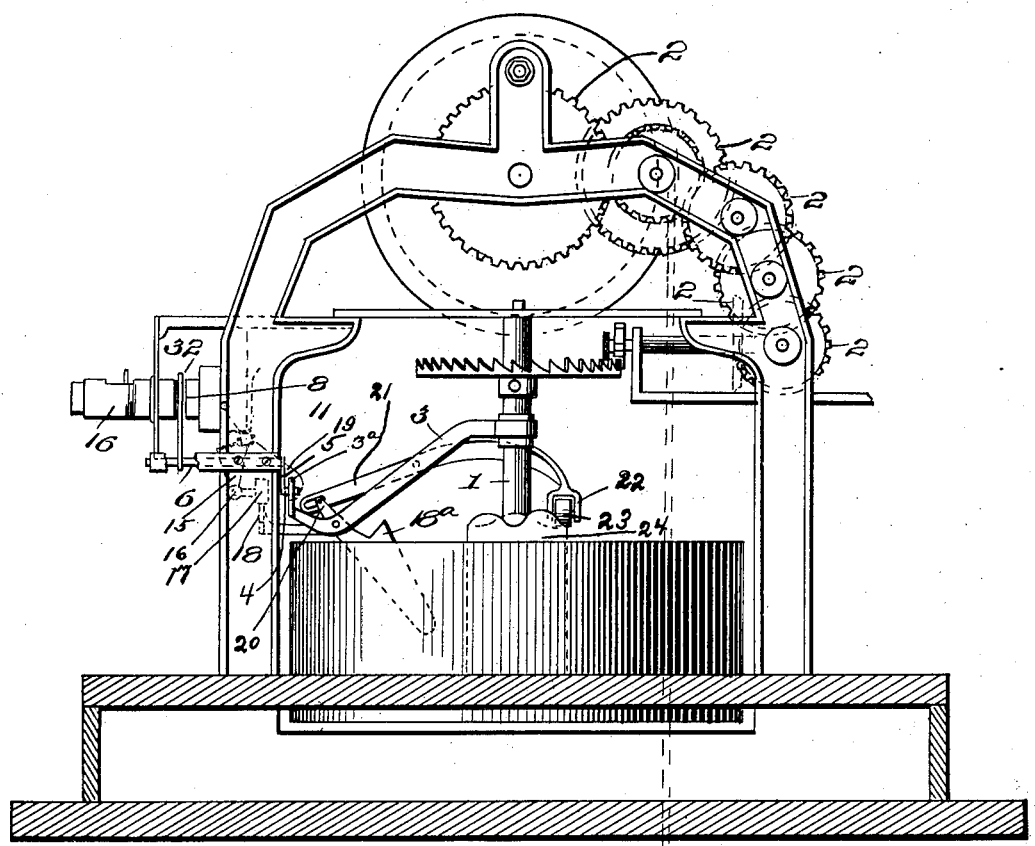
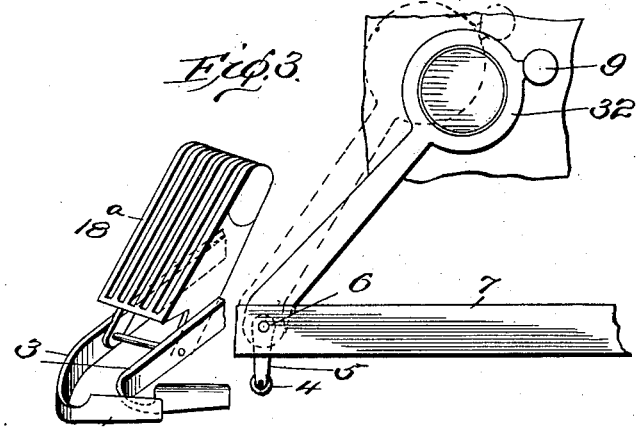
WITNESSES
INVENTOR.
Santiago Nuno Navascuez
BY Agramonte & Moore
ATTORNEYS.

No. 738,119. PATENTED SEPT. 1, 1903.
S. N. NAVASCUEZ.
SHUTTER FOR AUTOMATIC PHOTOGRAPHIC CAMERAS.
APPLICATION FILED SEPT. 4, 1902.
NO MODEL. 2 SHEETS—SHEET 2.
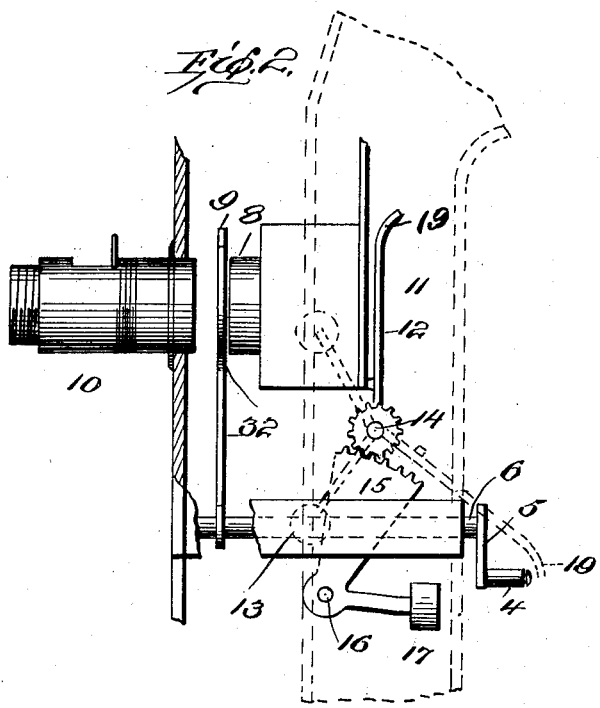
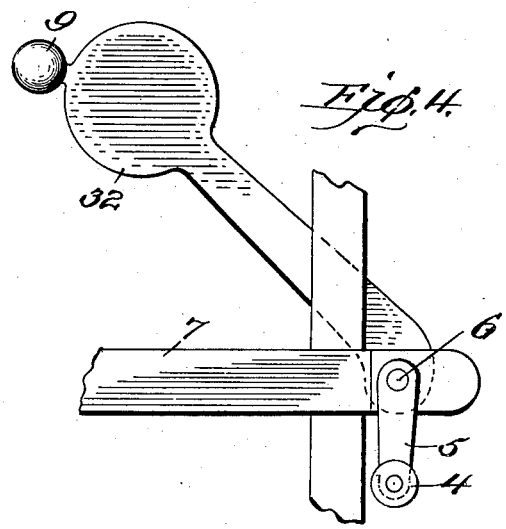
WITNESSES
INVENTOR.
Santiago Nuno Navascuez
BY
ATTORNEYS.

No. 738,119. Patented September 1, 1903.

UNITED STATES PATENT OFFICE.

SANTIAGO NUÑO NAVASCUEZ, OF MEXICO, MEXICO, ASSIGNOR OF SEVEN-TENTHS TO PAUL ELLE AND VICTOR CARRERA, OF MEXICO, MEXICO, AND FRANCISCO MIRANDO FERNANDEZ AND RAMON VELA HIDALGO BURRIEL, OF MEXICO.

SHUTTER FOR AUTOMATIC PHOTOGRAPHIC CAMERAS.

SPECIFICATION forming part of Letters Patent No. 738,119, dated September 1, 1903.

Original application filed October 31, 1901, Serial No. 80,626. Divided and this application filed September 4, 1902. Serial No. 122,121. (No model.)

*To all whom it may concern:*

Be it known that I, SANTIAGO NUÑO NAVASCUEZ, a subject of the King of Spain, a native of the Balearic Islands, residing at Mexico, in the State of Mexico and Republic of Mexico, have invented certain new and useful Improvements in Shutters for Automatic Photographic Cameras, of which the following is a specification.

This invention relates to improvements in shutters for automatic photographic cameras, and has special reference to a photographic shutter and means for automatically operating the shutter to expose the plate, this application being a divisional application of an application filed by me October 31, 1901, Serial No. 80,626.

It has been my object to produce a shutter which is very quick in action and which is operated by a mechanism which is controlled by weights or any other preferred motive power.

In the accompanying drawings, Figure 1 is a side elevation of a complete machine with which my improved shutter is placed in operative connection. Fig. 2 is an enlarged detail side view of the shutter-operating mechanism, parts being broken away and in section to clearly illustrate the device. Fig. 3 is a front elevation of my shutter mechanism. Fig. 4 is a rear elevation thereof.

Referring to the drawings, the numeral 1 designates a vertically-mounted revoluble shaft, which is set in operation by means of a train of gears 2, which causes its projecting arm 3 to cause its projection $3^a$ to contact a roller 4, carried upon the lower end of the crank-arm 5, which is connected to a shaft 6, journaled in the lower portion of the camera-box. Carried by the shaft is an upwardly-projecting shutter 32, which is adapted to close the tube 8 of the camera while the unexposed plate is in position in the camera. This shutter is provided with a weight 9 to return it, so as to close the tube 8.

The camera is provided with a lens-tube 10 and a plate-carrying mechanism 11. This mechanism consists of the cross-piece 12 to support the plate and is further provided with a counterweight 13 to return it to its normal position. To operate the cross-piece, I provide a shaft 14, operated by a toothed segment 15, which is pivoted at 16 and which is provided with a roller 17, which is adapted to contact the inclined plate 18, carried by the arm of the shaft 1. As the inclined plate 18 of the arm 3 engages the roller 17, tilting the cross-piece, the negative is caused to drop from the plate-support by its own weight into the basket $18^a$, carried by the arm 3, said plate being guided in its descent by means of an inclined chute 19, formed from the end of the cross-pin 12, as clearly shown in Fig. 2 in full and dotted lines. This basket $18^a$ has its short end 20 loosely connected to the outer end of the lever 21, which is pivotally connected intermediate of its length to the arm 3, the inner bifurcated end 22 of said lever carrying a roller 23, which is always in contact with the staggered upper end of the cylinder 24. As the shaft 1 revolves this lever is caused to move, so that the basket $18^a$ is tilted or raised for the purpose set forth, this mechanism, however, being clearly shown and described in an application filed by me of even date herewith, Serial No. 122,122. It will thus be seen that as the shaft 1 revolves the crank-arm is contacted by projection $3^a$ of the arm 3. The shaft 6, carrying the shutter, is caused to turn, slightly moving the shutter, so as to admit light through the lens into the camera-box and expose the plate. This contacting of the crank-arm is instantaneous, and as soon as released the weight 9 returns the shutter, and the plate-holding mechanism is operated by means of the plate 18 contacting the roller 17, causing the segment to move forward, and consequently the cross-piece 12 to tilt backward to free the exposed plate and allow it to be guided by the chute 19 of the cross-piece 12 to the receiving mechanism and developed.

What I claim as new is—

1. In combination with an automatic photographic camera, a shutter mechanism, comprising a shaft pivotally mounted in the body of the camera, a shutter carried by the shaft, a weight carried by the shutter to normally hold the shutter closed, and a crank adapted to be pressed upon to open the shutter.

2. In combination with a camera-box, a shutter, comprising an arm having an enlargement upon its end, a weight carried by said enlargement, an arm upon substantially the opposite side of the enlargement, a shaft mounted in the body of the camera and connected to said arm, and a crank connected to the shaft.

In testimony whereof I affix my signature in presence of two witnesses.

SANTIAGO NUÑO NAVASCUEZ.

Witnesses:
J. R. SOUTHWORTH,
E. H. CARMICHAEL.